(12) United States Patent
Sarh et al.

(10) Patent No.: US 8,666,546 B2
(45) Date of Patent: Mar. 4, 2014

(54) AUTONOMOUS ROBOTIC PLATFORM

(75) Inventors: Branko Sarh, Huntington Beach, CA (US); David H. Amirehteshami, Rossmore, CA (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 12/500,943

(22) Filed: Jul. 10, 2009

(65) Prior Publication Data

US 2011/0010007 A1   Jan. 13, 2011

(51) Int. Cl.
*G05B 19/418* (2006.01)
*G05B 15/00* (2006.01)
*G06F 19/00* (2011.01)

(52) U.S. Cl.
USPC .......... 700/248; 700/258; 901/1; 901/46

(58) Field of Classification Search
USPC ............ 700/248, 259, 258, 245; 33/503; 29/428, 244; 254/2 R, 4 R; 901/1, 46; 318/568.25; 701/1, 2
See application file for complete search history.

(56) References Cited

U.S. PATENT DOCUMENTS

| | | |
|---|---|---|
| 4,721,630 A | 1/1988 | Takeo et al. |
| 4,885,836 A | 12/1989 | Bonomi et al. |
| 4,926,544 A | 5/1990 | Koyanagi et al. |
| 4,967,947 A | 11/1990 | Sarh |
| 4,995,148 A | 2/1991 | Bonomi et al. |
| 5,191,639 A | 3/1993 | Hara |
| 5,661,892 A | 9/1997 | Catania et al. |
| 5,785,571 A | 7/1998 | Camp |
| 6,014,802 A | 1/2000 | Guerin |
| 6,108,896 A | 8/2000 | Gignac et al. |
| 6,357,101 B1 | 3/2002 | Sarh et al. |
| 6,428,452 B1 | 8/2002 | Dahlstrom et al. |
| 6,505,393 B2 | 1/2003 | Stoewer et al. |
| 6,536,100 B2 | 3/2003 | Sarh et al. |
| 6,729,809 B2 | 5/2004 | Sarh et al. |
| 6,772,508 B2 | 8/2004 | Bloch et al. |
| 6,898,484 B2 | 5/2005 | Lemelson et al. |
| 7,003,860 B2 | 2/2006 | Bloch et al. |
| 7,216,436 B2 | 5/2007 | Whitworth et al. |

(Continued)

FOREIGN PATENT DOCUMENTS

| | | |
|---|---|---|
| EP | 0338117 | 10/1989 |
| EP | 1686048 A2 | 8/2006 |

(Continued)

OTHER PUBLICATIONS

EP Search Report for application EP10250872 dated Feb. 22, 2011.

(Continued)

*Primary Examiner* — Ronnie Mancho
(74) *Attorney, Agent, or Firm* — Yee & Associates, P.C.

(57) ABSTRACT

The different advantageous embodiments may provide an apparatus that may comprise a number of robotic platforms, a wireless communications system, and a computer system. The number of robotic platforms may be configured to move to a number of locations in an assembly area and interact with a number of robotic devices. The wireless communications system may be configured to provide communication with the number of robotic platforms and the number of robotic devices within the assembly area. The computer system may be configured to exchange information with the number of robotic platforms and the number of robotic devices using the wireless communications system.

21 Claims, 9 Drawing Sheets

(56) References Cited

U.S. PATENT DOCUMENTS

| | | |
|---|---|---|
| 7,395,606 B2 | 7/2008 | Crampton |
| 7,507,059 B2 | 3/2009 | Hamann |
| 7,682,112 B2 | 3/2010 | Panczuk et al. |
| 7,699,713 B2 | 4/2010 | Chrisman, III |
| 7,937,817 B2 | 5/2011 | Sarh et al. |
| 7,967,549 B2 | 6/2011 | Geist et al. |
| 7,987,575 B2 | 8/2011 | Hotz et al. |
| 8,006,362 B2 | 8/2011 | Sarh |
| 8,051,547 B2 | 11/2011 | Toh et al. |
| 8,095,238 B2 | 1/2012 | Jones et al. |
| 8,235,368 B2 | 8/2012 | Brown et al. |
| 8,301,302 B2 | 10/2012 | Sarh et al. |
| 2002/0007548 A1 | 1/2002 | Stoewer et al. |
| 2003/0208302 A1 | 11/2003 | Lemelson et al. |
| 2004/0016097 A1 | 1/2004 | Bloch et al. |
| 2004/0117962 A1 | 6/2004 | Bloch et al. |
| 2005/0166413 A1* | 8/2005 | Crampton ............. 33/503 |
| 2008/0000070 A1 | 1/2008 | Hotz et al. |
| 2008/0028880 A1 | 2/2008 | Asada et al. |
| 2008/0133052 A1 | 6/2008 | Jones et al. |
| 2008/0155807 A1 | 7/2008 | Toh et al. |
| 2008/0244888 A1 | 10/2008 | Sarh |
| 2008/0295314 A1 | 12/2008 | Sarh et al. |
| 2009/0283949 A1 | 11/2009 | Brown et al. |
| 2010/0217437 A1 | 8/2010 | Sarh et al. |
| 2011/0099788 A1* | 5/2011 | Kilibarda ............. 29/428 |
| 2011/0245971 A1 | 10/2011 | Sarh et al. |

FOREIGN PATENT DOCUMENTS

| | | | |
|---|---|---|---|
| EP | 2116340 A1 | 11/2009 | |
| EP | 2221151 A2 | 8/2010 | |
| EP | 2298507 A1 | 3/2011 | |
| JP | 2005046926 A | 2/2005 | |
| JP | 2007193736 A | 8/2007 | |
| WO | 0245915 A1 | 6/2002 | |
| WO | 2008151345 A2 | 12/2008 | |

OTHER PUBLICATIONS

U.S. Appl. No. 12/117,153, filed May 8, 2008, Sarh et al.
U.S. Appl. No. 12/391,780, filed Feb. 24, 2009, Sarh et al.
U.S. Appl. No. 12/121,137, filed May 15, 2008, Sarh et al.
U.S. Appl. No. 12/119,513, filed May 13, 2008, Sarh et al.
EPO search report dated Jun. 4, 2010 regarding application EP10250320.
European Search Report, dated Jul. 23, 2009, regarding Application No. EP09155313 (EP2116340), 3 pages.
Notice of Allowance, dated Sep. 5, 2012, regarding USPTO U.S. Appl. No. 12/117,153, 5 pages. (08-0113).
Office Action, dated Aug. 16, 2012, regarding USPTO U.S. Appl. No. 12/391,780, 27 pages. (08-1110).
Rooks, "Automatic wing box assembly developments," Industrial Robot: An International Journal, vol. 28, No. 4, 2001, pp. 297-302.
Roy et al., "Design of a Reconfigurable Robot Arm for Assembly Operations Inside an Aircraft Wing-Box," Proceedings of the 2005 IEEE International Conference on Robotics and Automation, Apr. 2005, pp. 590-595 (Abstract).
Roy et al., "An Underactuated Robot with a Hyper-Articulated Deployable Arm Working Inside an Aircraft Wing-Box," 2005 IEEE/RSJ International Confdrence on Intelligent Robots and Systems, Aug. 2005, pp. 4046-4050 (Abstract).
USPTO non-final office action dated Apr. 18, 2012 regarding U.S. Appl. No. 12/117,153, 16 Pages.
USPTO non-final office action dated Sep. 29, 2011 regarding U.S. Appl. No. 12/117,153, 17 Pages.
Response to office action dated Dec. 29, 2011 regarding U.S. Appl. No. 12/117,153, 6 Pages.
USPTO restriction requirement dated May 10, 2012 regardinig U.S. Appl. No. 12/391,780, 7 Pages.
Final Office Action, dated Feb. 13, 2013, regarding USPTO U.S. Appl. No. 12/391,780, 28 pages.

* cited by examiner

US 8,666,546 B2

AUTONOMOUS ROBOTIC PLATFORM

BACKGROUND INFORMATION

1. Field

The present disclosure relates generally to assembly of objects and, in particular, to an automated system for assembly and maintenance of objects. Still more particularly, the present disclosure relates to a method and apparatus for assembling aircraft structures using an autonomous robotic platform system.

2. Background

Structural assembly and maintenance may be complex and may require high level dexterity systems. This requirement may limit the use of conventional machinery, such as many current robotic systems, for several assembly operations. Structural assembly operations may be carried out manually or using machines and robots. Currently used machines and robots may be fixed on a factory floor or may move on rails to perform assembly tasks.

Fixed factory installed machines and robots may limit manufacturing and assembly flexibility. These fixed machines and robots are dedicated to a few specific tasks, and may be hardwired to the factory floor and utilities. This fixed installation limits flexibility in using these machines and robots in other areas within a manufacturing environment. The size of these machines and robots for assembly of large structures, such as an aircraft wing or fuselage, may also limit applicability in manufacturing operations where space is at issue. Likewise, the cost of these fixed factory machines and robots may become unaffordable in relation to the specific task the machine or robot is designed to perform. For example, robotic systems installed on rails may have limited work volume and grow very large in size to work on aircraft structures.

Therefore, it would be advantageous to have a method and apparatus that takes into account the issues described above as well as possibly other issues.

SUMMARY

Thus, one or more of the different advantageous embodiments may provide an apparatus that may comprise a number of robotic platforms, a wireless communications system, and a computer system. The number of robotic platforms may be configured to move to a number of locations in an assembly area and interact with a number of robotic devices. The wireless communications system may be configured to provide communication with the number of robotic platforms and the number of robotic devices within the assembly area. The computer system may be configured to exchange information with the number of robotic platforms and the number of robotic devices using the wireless communications system.

The different advantageous embodiments may further provide a method for performing operations using a robotic platform. Commands may be received by the robotic platform from a cell controller to perform a number of tasks at a number of locations using a first robotic device in a number of robotic devices. The robotic platform may interact with the first robotic device in the number of robotic devices. The first robotic device may be moved to a first location in the number of locations.

The different advantageous embodiments may further provide an apparatus that may comprise a robotic platform having a platform controller, a mobility system, a utility system, a device connection interface, and a communications unit. The platform controller may be configured to move the robotic platform to a number of locations. The mobility system may be coupled to the robotic platform and may be configured to be controlled by the platform controller. The utility system may be coupled to the robotic platform and may be configured to supply utilities to a number of robotic devices. The device connection interface may be configured to physically associate the number of robotic devices with the robotic platform.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
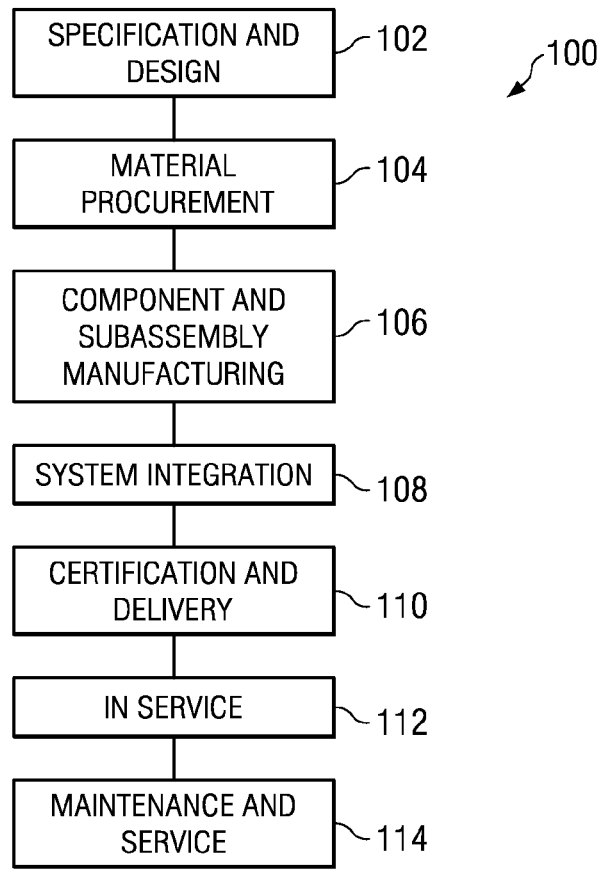
FIG. 1 is an illustration of an aircraft manufacturing and service method in accordance with an advantageous embodiment.
Figure 2:
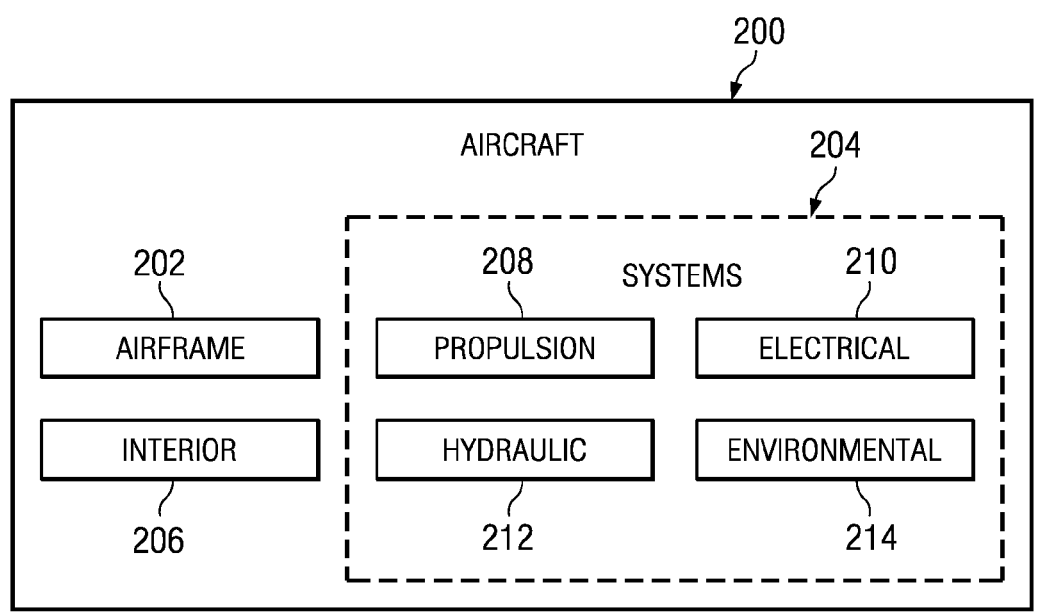
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry. Additionally, different advantageous embodiments may be applied to other infrastructure industries, such as bridges and buildings.

Apparatus and methods embodied herein may be employed during any one or more of the stages of aircraft manufacturing and service method 100 in FIG. 1. For example, components or subassemblies produced in component and subassembly manufacturing 106 in FIG. 1 may be inspected while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the inspection and/or maintenance of aircraft 200.

The different advantageous embodiments recognize and take into account a number of different considerations. For example, the different advantageous embodiments recognize and take into account that currently used methods for structural assembly operations are carried out manually or with machines and robots that are fixed on a factory floor or move along rails. Fixed factory machines and robots may have limited flexibility, are dedicated to a few specific tasks, and may be hardwired to the factory floor and utilities.

Thus, one or more of the different advantageous embodiments may provide an apparatus that may comprise a number of robotic platforms, a wireless communications system, and a computer system. The number of robotic platforms may be configured to move to a number of locations in an assembly area and interact with a number of robotic devices. The wireless communications system may be configured to provide communication with the number of robotic platforms and the number of robotic devices within the assembly area. The computer system may be configured to exchange information with the number of robotic platforms and the number of robotic devices using the wireless communications system.

The different advantageous embodiments may further provide a method for performing operations using a robotic platform. Commands may be received by the robotic platform from a cell controller to perform a number of tasks at a number of locations using a first robotic device in a number of robotic devices. The robotic platform may interact with the first robotic device in the number of robotic devices. The first robotic device may be moved to a first location in the number of locations.

The different advantageous embodiments may further provide an apparatus that may comprise a robotic platform having a platform controller, a mobility system, a utility system, a device connection interface, and a communications unit. The platform controller may be configured to move the robotic platform to a number of locations. The mobility system may be coupled to the robotic platform and may be configured to be controlled by the platform controller. The utility system may be coupled to the robotic platform and may be configured to supply utilities to a number of robotic devices. The device connection interface may be configured to physically associate the number of robotic devices with the robotic platform.

As a specific illustrative example, one or more of the different advantageous embodiments may be implemented, for example, without limitation, during component and subassembly manufacturing 106, system integration 108, certification and delivery 110, service 112, and maintenance and service 114 in FIG. 1 to assemble a structure for aircraft 200. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
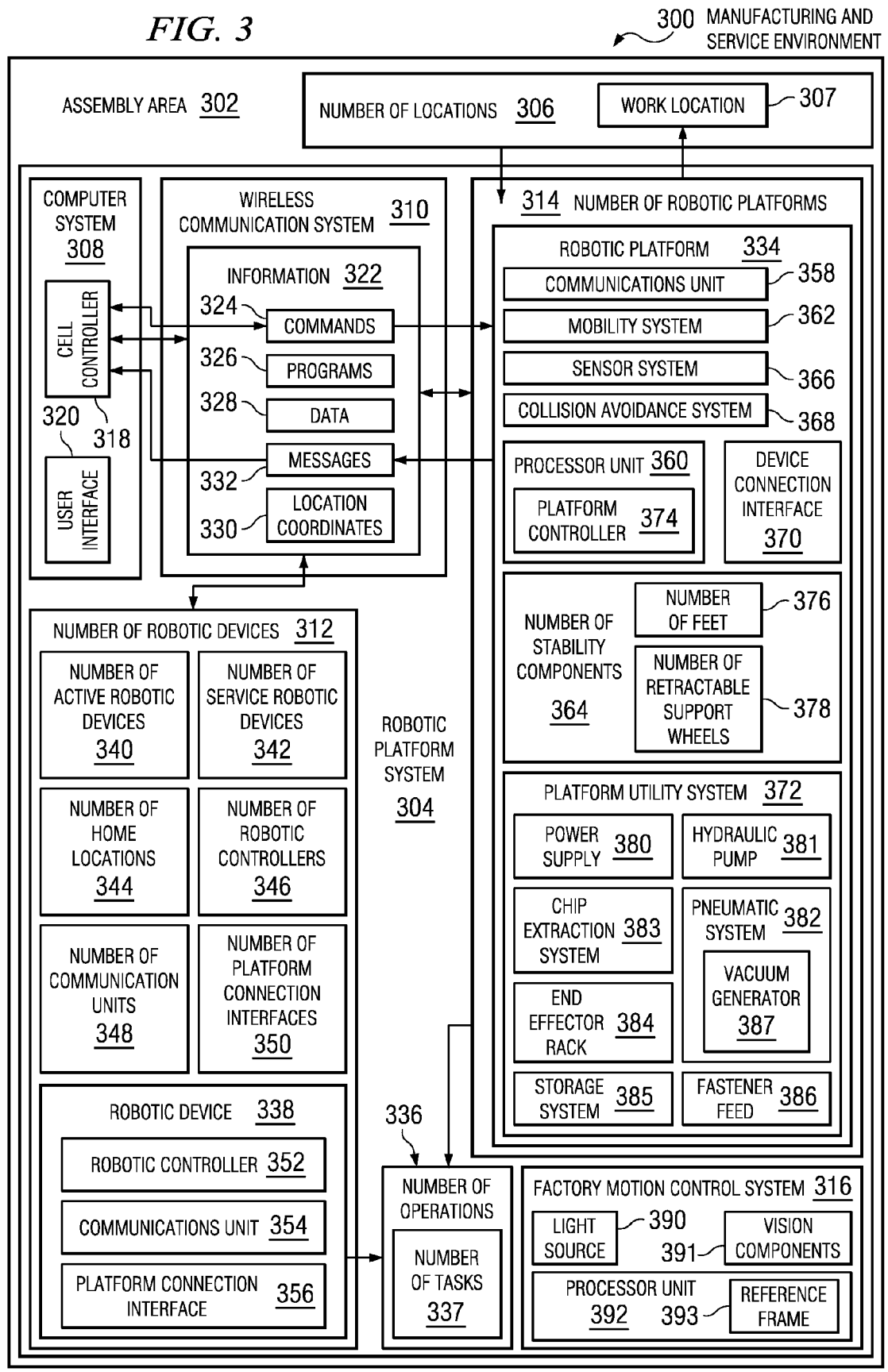
FIG. 3 is an illustration of a manufacturing and service environment in accordance with an advantageous embodiment.

With reference now to FIG. 3, an illustration of a manufacturing and service environment is depicted in accordance with an advantageous embodiment. Manufacturing and service environment 300 may be any environment in which objects and/or structures are manufactured, assembled, inspected, and serviced.

Manufacturing and service environment 300 may include assembly area 302 and robotic platform system 304. Assembly area 302 may be one example of an area used to manufacture and service aircraft 200 in FIG. 2 during component and subassembly manufacturing 106 and maintenance and service 114 in FIG. 1, for example.

Robotic platform system 304 may include number of locations 306, computer system 308, wireless communications system 310, number of robotic devices 312, number of robotic platforms 314, and factory motion control system 316. Number of locations 306 may be, without limitation, a number of different work stations located throughout assembly area 302, a number of different home locations for robotic devices, and/or any other locations in manufacturing and service environment 300. Location 307 may be an illustrative example of one location in number of locations 306.

Computer system 308 may include cell controller 318 and user interface 320. Cell controller 318 may be capable of generating information 322 and sending information 322 to number of robotic devices 312 and number of robotic platforms 314 using wireless communication system 310. Information 322 may include, for example, without limitation, commands 324, programs 326, data 328, location coordinates 330, messages 332, and/or any other suitable information. In an advantageous embodiment, number of robotic devices 312 and number of robotic platforms 314 may also send information 322 back to cell controller 318 using wireless communication system 310.

Wireless communications system 310 may be used to exchange information 322 between number of robotic platforms 314, number of robotic devices 312, and/or computer system 308. Information 322 may be exchanged between different robotic devices within number of robotic devices 312 as well as between computer system 308 and number of robotic devices 312. Information 322 may be exchanged between different platforms within number of robotic platforms 314 as well as between computer system 308 and number of robotic platforms 314. Information 322 may be exchanged between number of robotic devices 312 and number of robotic platforms 314.

Commands 324 and/or programs 326 may be issued by cell controller 318 executed on computer system 308 and/or other devices within number of robotic devices 312 and/or number of robotic platforms 314. Programs 326 may contain computer readable instructions in a functional form that can be executed by number of robotic devices 312 and/or number of robotic platforms 314 to perform number of operations 336. Number of operations 336 may include number of tasks 337. Each operation in number of operations 336 may include number of tasks 337, for example. Operations may be, for example, without limitation, retrieving a robotic device, interacting with a robotic device, moving a robotic device to a station, providing a robotic device with utilities to perform a task, interchangeably switching out one robotic device for another robotic device, and/or any other suitable operation.

Commands 324 and/or programs 326 may be sent before and/or during execution of number of operations 336. For example, if a particular robotic device, such as robotic device 338 in number of robotic devices 312, completes a task in number of tasks 337, a new program in programs 326 may be sent to robotic device 338 by cell controller 318 to cause robotic device 338 to perform a next task in number of tasks 337. In another illustrative example, if robotic device 338 interacts with, or physically associates with, robotic platform 334 and completes number of tasks 337 at location 307 in number of locations 306, a new command in commands 324 may be sent to robotic platform 334 by cell controller 318 to cause robotic platform 334 to move robotic device 338 to another location in number of locations 306 in order to perform number of tasks 337 at a different location.

Commands 324 and/or programs 326 may be issued by cell controller 318 and may provide instructions for execution of number of operations 336. Data 328 may be issued by number of robotic devices 312 and may provide operational information to number of robotic platforms 314. Operational information may include, for example, without limitation, information about a task completion, a partial task completion, a task status, a task requirement, a robotic device requirement, and/or any other suitable operational information. Messages 332 may be, for example, without limitation, status messages, requests, alerts, errors, queries, sensor data, and/or other suitable types of messages.

In an illustrative example, cell controller 318 may generate commands 324 and send the commands 324 to robotic platform 334. Robotic platform 334 may process commands 324 and generate message 332. Message 332 may be sent back to cell controller 318 using wireless communication system 310 in this illustrative example.

Robotic device 338 may be an example of one type of robotic device in number of robotic devices 312. Number of robotic devices 312 may include number of active robotic devices 340 and number of service robotic devices 342. Number of active robotic devices 340 may be robotic devices actively deployed to number of locations 306 in assembly area 302 to perform number of operations 336.

Number of service robotic devices 342 may be robotic devices cable of assisting number of active robotic devices 340. Assisting may refer to, without limitation, retrieval of parts, objects, tools, active robotic devices, and/or any other item that may be required by number of active robotic devices 340 to complete number of operations 336 without leaving assembly area 302. In one advantageous embodiment, number of service robotic devices 342 may be capable of interchangeably switching out one active robotic device currently associated with a robotic platform for another active robotic device, all within assembly area 302. In other words, number of service robotic devices 342 may be capable of manipulating the interactions between number of active robotic devices 340 and number of robotic platforms 314.

In an illustrative example, robotic device 338 may be an example of one implementation of an active robotic device of number of active robotic devices 340. Robotic device 338 may be physically associated with robotic platform 334 and operating to perform number of tasks 337. During operation, robotic device 338 may identify a need for additional parts to complete number of tasks 337. Robotic device 338 may send data 328 using wireless communication system 310 to robotic platform 314. Robotic platform 314 may then send message 332 to cell controller 318 about the need for additional parts to complete number of tasks 337. Cell controller 318 may send commands 324 to number of robotic platforms 314 to deploy another robotic platform and locate a service robotic device in number of service robotic devices 342. The service robotic device may interact with the robotic platform sent to retrieve it, and may be used to locate the needed parts and bring the needed parts to robotic device 338 in assembly area 302.

Number of robotic devices 312 may include number of home locations 344, number of robotic controllers 346, number of communication units 348, and number of platform connection interfaces 350. Number of home locations 344 may be the locations where number of robotic platforms 314 retrieve and/or exchange a robotic device.

In an illustrative example, cell controller 318 may send information 322 to robotic platform 334. Information 322 may direct robotic platform 334 to interact with robotic device 338. Robotic device 338 may include robotic controller 352, communications unit 354, and platform connection interface 356. Robotic platform 334 may locate robotic device 338 at number of home locations 344, and interact with robotic device 338 using platform connection interface 356. As used herein, interact, or interacting with, may refer to, without limitation, physically associating, physically manipulating, sending control signals, supplying power, supplying utilities to operate a robotic device, and/or any other suitable form of interaction. For example, physically associating with a robotic device may include, without limitation, physically connecting a robotic device to a robotic platform, having a robotic platform pick up a robotic device, moving a robotic device using a robotic platform, manipulating a robotic device using a robotic platform, and/or any other suitable form of physical association between a robotic platform and a robotic device. In an illustrative example, robotic platform 334 may interact with robotic device 338 using platform connection interface 356 to physically associate with robotic device 338 and may then move robotic device 338 to number of locations 306 using location coordinates 330 received in information 322.

Number of robotic controllers 346 may control the operation of number of robotic devices 312. Number of robotic controllers 346 may execute commands 324, programs 326, and data 328 received from cell controller 318 through wireless communication system 310. In these illustrative examples, wireless communications unit 310 may provide the capability to transfer information, such as commands 324, programs 326, data 328, and messages 332 between number of robotic devices 312, number of robotic platforms 314, and cell controller 318.

Number of communication units 348, in these examples, provides for communications with other data processing systems or devices using wireless communication system 310. Number of communication units 348 may include, for example, without limitation, transmitters, receivers, transceivers, and/or other suitable types of communication devices.

Number of platform connection interfaces 350 may include mechanical and/or electrical connect/disconnect interfaces between number of robotic devices 312 and number of robotic platforms 314 for robotic device interaction. Electrical connections may join two lengths of flexible wire or cable, or may connect a wire or cable to an electrical terminal, for example. Electrical connections may include, for example, without limitation, temporary connectors, terminal blocks, posts, plug and socket connectors, component and device connectors, blade connectors, eight positions eight conductors (8P8C) modular connectors, D-subminiature connectors, universal serial bus (USB) connectors, power connectors, radio frequency connectors, direct current (DC) connectors, and/or any other suitable type of electrical connectors.

Mechanical connections may temporarily secure a robotic device to a robotic platform during interacting between the robotic device and the robotic platform. Mechanical connections may include, for example, without limitation, mounting plates, slots, sockets, receptacles, outlets, plugs, prongs, pins, and/or any other suitable mechanical connector. In an illustrative example, a mechanical connection may be implemented as a number of locking pins on a robotic platform, which associate with a number of slots of a mounting plate on a robotic device. In this illustrative example, number of platform connection interfaces 350 may be the mounting plate with the number of slots, while device connection interface 370 may be the number of locking pins. The insertable slots of the mounting plate of number of platform connection interfaces 350 allow locking pins located in device connection interface 370 of the robotic platform to secure the robotic device to the robotic platform, in this illustrative example.

Robotic platform 334 may include communications unit 358. Communications unit 358, in these examples, provides for communications with other data processing systems or devices using wireless communication system 310. Communications unit 358 may include, for example, without limitation, transmitters, receivers, transceivers, and/or other suitable types of communication devices.

Robotic platform 334 may include processor unit 360, mobility system 362, number of stability components 364, sensor system 366, collision avoidance system 368, device connection interface 370, and platform utility system 372.

Processor unit 360 may include platform controller 374. Platform controller 374 may control the operation of robotic platform 334. Platform controller 374 may receive information 322 through wireless communication system 310 and execute commands 324 and programs 326. Platform controller 374 may process data 328 and location coordinates 330 in order to execute commands 324 and/or programs 326 to complete number of operations 336. In these illustrative examples, information 322 may be transferred between number of robotic devices 312, number of robotic platforms 314, and cell controller 318.

Mobility system 362 may include, without limitation, propulsion systems, steering systems, braking systems, number of mobility components, and/or any other mobility components for robotic platform 334.

Number of stability components 364 may include, without limitation, number of feet 376 and number of retractable support wheels 378.

Sensor system 366 may be a distributed system, with components distributed on robotic platform 334 and throughout assembly area 302. Sensor system 366 interacts with factory motion control system 316 to identify and monitor the position and movement of number of robotic platforms 314. Sensor system 366 may include, without limitation, radar detectors, laser detectors, reflective components, motion sensors, and/or any other suitable sensors.

Collision avoidance system 368 may include, without limitation, cameras, radar, laser, sonar, and/or any other suitable collision avoidance component.

Device connection interface 370 may include mechanical and/or electrical connect/disconnect interfaces between number of robotic devices 312 and robotic platform 334 for robotic device interaction.

Platform utility system 372 may include, without limitation, power supply 380, hydraulic pump 381, pneumatic system 382, chip extraction system 383, end effector rack 384, storage 385, fastener feed 386, and/or any other suitable utility. Power supply 380 may include, without limitation, batteries. Power supply 380 may provide power to both robotic platform 334 and the robotic device that is currently interacting with robotic platform 334, such as robotic device 338.

Hydraulic pump 381 may be a hydrostatic or hydrodynamic pump providing either fixed or variable displacement. Hydraulic pump 381 may be, for example, without limitation, a gear pump, gerotor pump, rotary vane pump, screw pump, bent axis pump, axial piston pump, radial piston pump, peristaltic pump, and/or any other suitable type of hydraulic pump. In one advantageous embodiment, different types of robotic devices may operate using hydraulics to accomplish a task or operation. In an illustrative example, robotic device 338 may be directed to perform a task such as attaching fasteners to a structure or parts of a structure. In this illustrative example, a collar may be used in conjunction with the fastener to secure the connection, which may require a large amount of force or pressure to squeeze the collar into place. This type of force or pressure may be provided to the end effector of robotic device 338 by hydraulic pump 381 in this illustrative example.

Pneumatic system 382 may include a piston, a cylinder, and valves or ports. Pneumatic system 382 may convert energy in the form of compressed air into motion.

Pneumatic system 382 may include vacuum generator 387, for example.

Chip extraction system 383 may be capable of extracting chips from an end effector area of a robotic device, such as robotic device 338 for example. Chip extraction system 383 may deposit the extracted chips into storage 385. Chips may refer to, without limitation, chips, composite dust, lubrication, and/or any other element that may be extracted from an end effector area.

End effector rack 384 may provide a resting place for end effector elements of a robotic device during movement of robotic platform 334.

Storage 385 may provide a number of storage areas for robotic platform 334. For example, storage 385 may provide storage for extracted chips using chip extraction system 383. In another example, storage 385 may provide storage for parts used by a robotic device, such as robotic device 338. In one illustrative example, storage 385 may contain fasteners used by robotic device 338 during number of operations 336.

Fastener feed 386 may provide a feed from storage 385 to robotic device 338 physically associated with robotic platform 334 for use during number of operations 336, for example.

Factory motion control system 316 may include, without limitation, light source 390, vision component 391, and processor unit 392. Light source 390 may emit light in a number of different frequencies, wavelengths, and/or intensities. Light source 390 may be used in conjunction with sensor system 366 to identify location of number of robotic platforms 314 within assembly area 302. In an illustrative example, sensor system 366 may include reflective components distributed on robotic platform 334 that may reflect light emitted from light source 390 back to vision components 391 of factory motion control system 316. This reflective light may enable factory motion control system 316 to identify the position and/or location of robotic platform 334, as well as the movement of robotic platform 334. Vision components 391 may include, for example, without limitation, a number of cameras, and/or any other suitable type of vision component. The number of cameras may be any type of camera, including, without limitation, digital cameras, video cameras, visible light cameras, infrared cameras, internet protocol (IP) cameras, and/or any other suitable type of camera. Vision components 391 may capture a series of data using the reflected light from the reflective components of sensor system 366. This series of data may be sent to processor unit 392, which may be capable of generating a three dimensional map or image of assembly area 302. Processor unit 392 may include reference frame 393, which may be loaded onto processor unit 392 in advance. Processor unit 392 may relate the series of data captured from tracking the position and/or movement of a robotic platform with reference frame 393 in order to generate the three dimensional map or image.

The illustration of maintenance and service environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, robotic platform system 304 may include number of robotic platforms 314 and number of robotic devices 312 for performing manufacturing and service operations in a manner faster than currently available assembly systems. A structure may be, for example, aircraft 200 in FIG. 2. In another illustrative example, a structure may be, for example, without limitation, an aircraft, a spacecraft, a submarine, a surface ship, a vehicle, a tank, a building, a manufacturing floor, an engine, and/or some other suitable type of structure. In yet another illustrative example, a structure may be a part of a structure. For example, in the illustrative example of an aircraft, a part of a structure may be, for example, without limitation, a wing, fuselage, engine, and/or some other suitable part of an aircraft structure.

Figure 4:
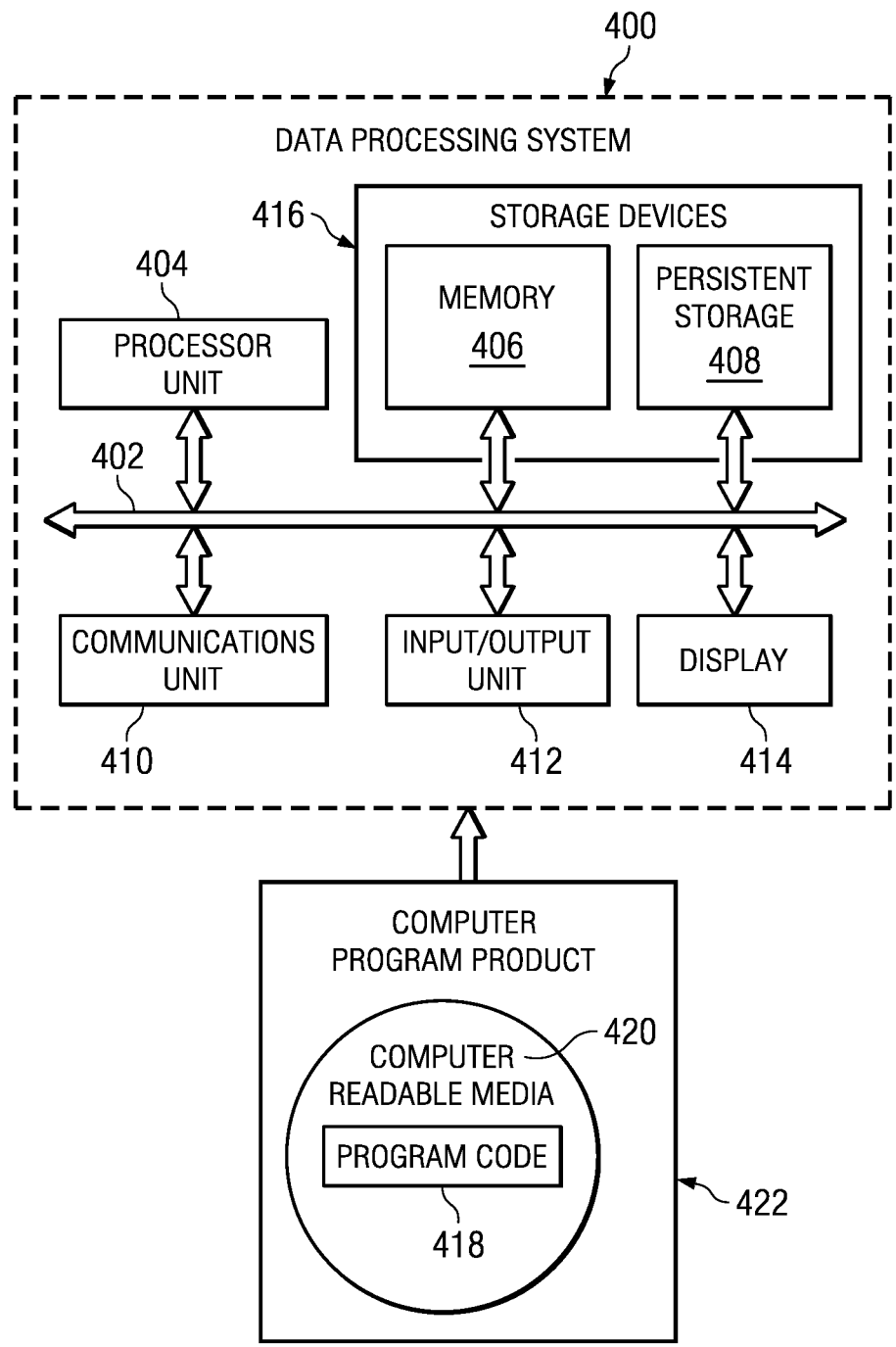
FIG. 4 is an illustration of a data processing system in accordance with an illustrative embodiment.

With reference now to FIG. 4, an illustration of a data processing system is depicted in accordance with an illustrative embodiment. Data processing system 400 may be used to implement different computers and data processing systems within a manufacturing and service environment, such as computer system 308, number of robotic controllers 346, and processor unit 360 in FIG. 3.

In this illustrative example, data processing system 400 includes communications fabric 402, which provides communications between processor unit 404, memory 406, persistent storage 408, communications unit 410, input/output (I/O) unit 412, and display 414. Depending on the particular implementation, different architectures and/or configurations of data processing system 400 may be used.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device may be any piece of hardware that may be capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 may be a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instruction are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 420 may be located in a functional form on computer readable media 418 that may be selectively removable and may be loaded onto or transferred to data processing system 400 for execution by processor unit 404. Program code 420 and computer readable media 418 form computer program product 422 in these examples. In one example, computer readable media 418 may be in a tangible form, such as, for example, an optical or magnetic disc that may be inserted or placed into a drive or other device that may be part of persistent storage 408 for transfer onto a storage device, such as a hard drive that may be part of persistent storage 408. In a tangible form, computer readable media 418 also may take the form of a persistent storage, such as a hard drive, a thumb drive, or a flash memory that may be connected to data processing system 400. The tangible form of computer readable media 418 may also be referred to as computer recordable storage media. In some instances, computer readable media 418 may not be removable.

Alternatively, program code 420 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 420 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 420 may be a server computer, a client computer, or some other device capable of storing and transmitting program code 420.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 may be any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
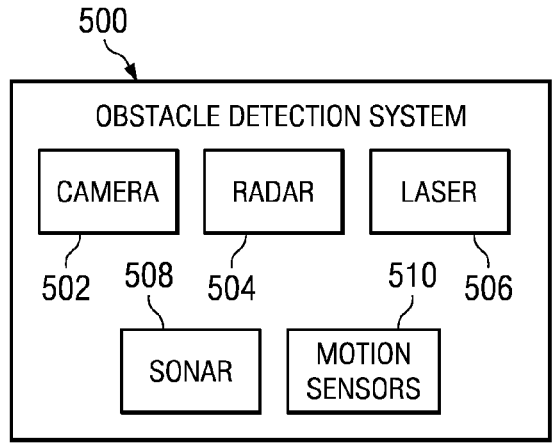
FIG. 5 is an illustration of an collision avoidance system in accordance with an illustrative embodiment.

With reference now to FIG. 5, an illustration of a collision avoidance system is depicted in accordance with an illustrative embodiment. Collision avoidance system 500 may be an example of an illustrative embodiment of collision avoidance system 368 in FIG. 3. Collision avoidance system 500 may be used by a robotic platform, such as robotic platform 334 in FIG. 3, to avoid collision and interference with other objects during movement of the robotic platform. Collision avoidance system 500 may include camera 502, radar 504, laser 506, sonar 508, and motion sensors 510. Camera 502 may be, without limitation, a wireless camera, pan/tilt/zoom camera, infrared camera, and/or any other suitable camera used to capture visual information such as still and/or moving images, for example.

Radar 504 may use electromagnetic waves to identify the range, altitude, direction, or speed of both moving and fixed objects. Laser 506 may emit light and/or electromagnetic radiation in a spatially coherent manner. Spatial coherence may refer to light that may either be emitted in a narrow, low-divergence beam, or may be converted into a narrow, low-divergence beam with the help of optical components, such as lenses for example. Sonar 508 may use sound propagation on an ultrasonic frequency to measure the distance to an object by measuring the time from transmission of a pulse to reception and converting the measurement into a range using the known speed of sound.

Motion sensors 510 may detect motion of objects in the environment by measuring change in speed or vector of an object or objects in the field of view. Motion sensors 510 may operate in conjunction with camera 502 for example. Motion sensors 510 may measure change in speed or vector either by mechanical devices that physically interact with the field or by electronic devices that quantifies and measures changes in the given environment.

Collision avoidance system 500 may use one or more components such as camera 502, radar 504, laser 506, and sonar 508 to detect and avoid collision with objects, robotic devices, and other robotic platforms in an environment, such as manufacturing and service environment 300 in FIG. 3.

The illustration of collision avoidance system 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
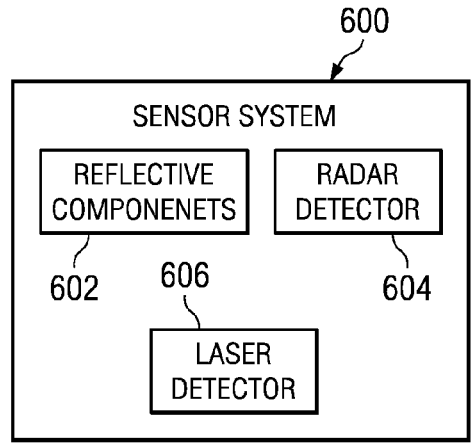
FIG. 6 is an illustration of a sensor system in accordance with an illustrative embodiment.

With reference now to FIG. 6, an illustration of a sensor system is depicted in accordance with an illustrative embodiment. Sensor system 600 may be an example of one implementation of sensor system 366 in FIG. 3.

Sensor system 600 may be distributed throughout an assembly area, such as assembly area 302 in FIG. 3, and a number of robotic platforms, such as number of robotic platforms 314 in FIG. 3. Sensor system 600 may use passive and/or active sensors to interface with a factory motion control system, such as factory motion control system 316 in FIG. 3. Sensor system 600 may include, without limitation, reflective components 602, radar detector 604, laser detector 606, motion sensors 608, and/or any other suitable sensor.

Reflective components 602 may be any type of reflective material. Reflective components 602 may be pieces of reflective material affixed to the outer portion of a number of robotic platforms. Reflective components 602 may allow vision components of a factory motion control system, such as vision components 391 of factory motion control system 316 in FIG. 3, to capture image data for the number of robotic platforms and orient the location of the robotic platforms in space, such as assembly area 302 for example. In an illustrative example, reflective components 602 may reflect light emitted from a light source of a factory motion control system, such as light source 390 in FIG. 3, and allow the factory motion control system to detect motion of the robotic platforms in space. Reflective components 602 may also allow other components of sensor system 600 to detect position and/or movement of robotic platforms.

Radar detector 604 may emit and detect electromagnetic waves reflected back from reflective components 602. Radar detector 604 may be a component of sensor system 600 distributed throughout an environment, such as assembly area 302 in FIG. 3. In an illustrative example, radar detector 604 may detect reflected electromagnetic waves off of reflective components 602, and transmit the information detected to a factory motion control system for processing, such as factory motion control system 316 in FIG. 3.

Laser detector 606 may emit and detect light or electromagnetic radiation reflected back from reflective components 602. Laser detector 606 may be a component of sensor system 600 distributed throughout an environment, such as assembly area 302 in FIG. 3.

The illustration of sensor system 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
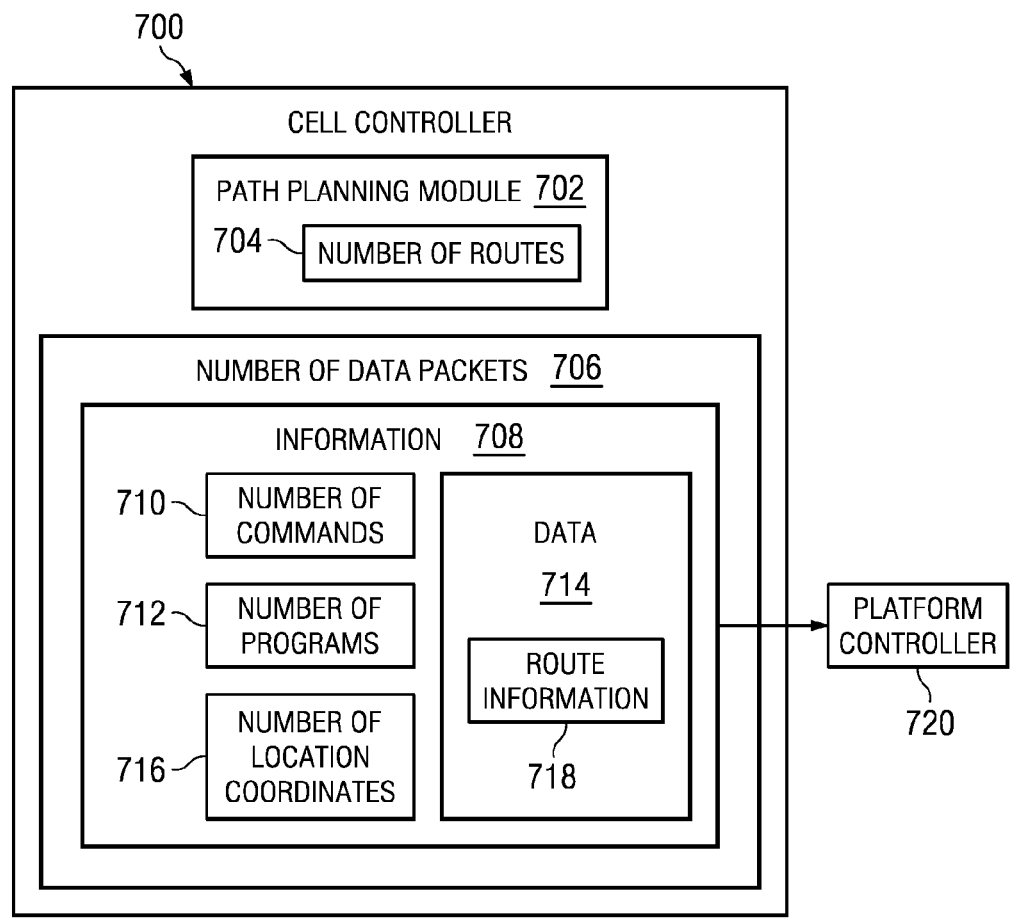
FIG. 7 is an illustration of a cell controller in accordance with an illustrative embodiment.

With reference now to FIG. 7, an illustration of a cell controller is depicted in accordance with an illustrative embodiment. Cell controller 700 may be an example of one implementation of cell controller 318 in FIG. 3.

Cell controller 700 may include path planning module 702. Path planning module 702 may be capable of executing any type of process for detailing a task into atomic motions. Path planning module 702 may generate a number of routes 704. Number of routes 704 may be integrated into number of data packets 706 generated by cell controller 700. Number of data packets 706 may include information 708. Information 708 may include, without limitation, number of commands 710, number of programs 712, data 714, number of location coordinates 716 and/or other suitable information. Data 714 may include route information 718 incorporated from number of routes 704. Number of data packets 706 may be sent to platform controller 720. Platform controller 720 may be an example of one implementation of platform controller 314 in FIG. 3.

In an illustrative example, cell controller 700 may generate number of routes 704 using path planning module 702. Cell controller 700 may generate number of data packets 706 incorporating number of routes 704 into data 714 as route information 718. Number of data packets 706 may be sent to platform controller 720, which controls a robotic platform.

Number of data packets 706 may contain information 708, which provides platform controller 720 with the information needed to perform operations, such as number of operations 336 in FIG. 3. Operations may be, for example, without limitation, retrieving a robotic device, moving a robotic device to a station, providing a robotic device with utilities to perform a task, interchangeably switching out one robotic device for another robotic device, and/or any other suitable operation. Platform controller 720 may use route information 718 to move the associated robotic platform within an area such as assembly area 302 in FIG. 3.

The illustration of cell controller 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
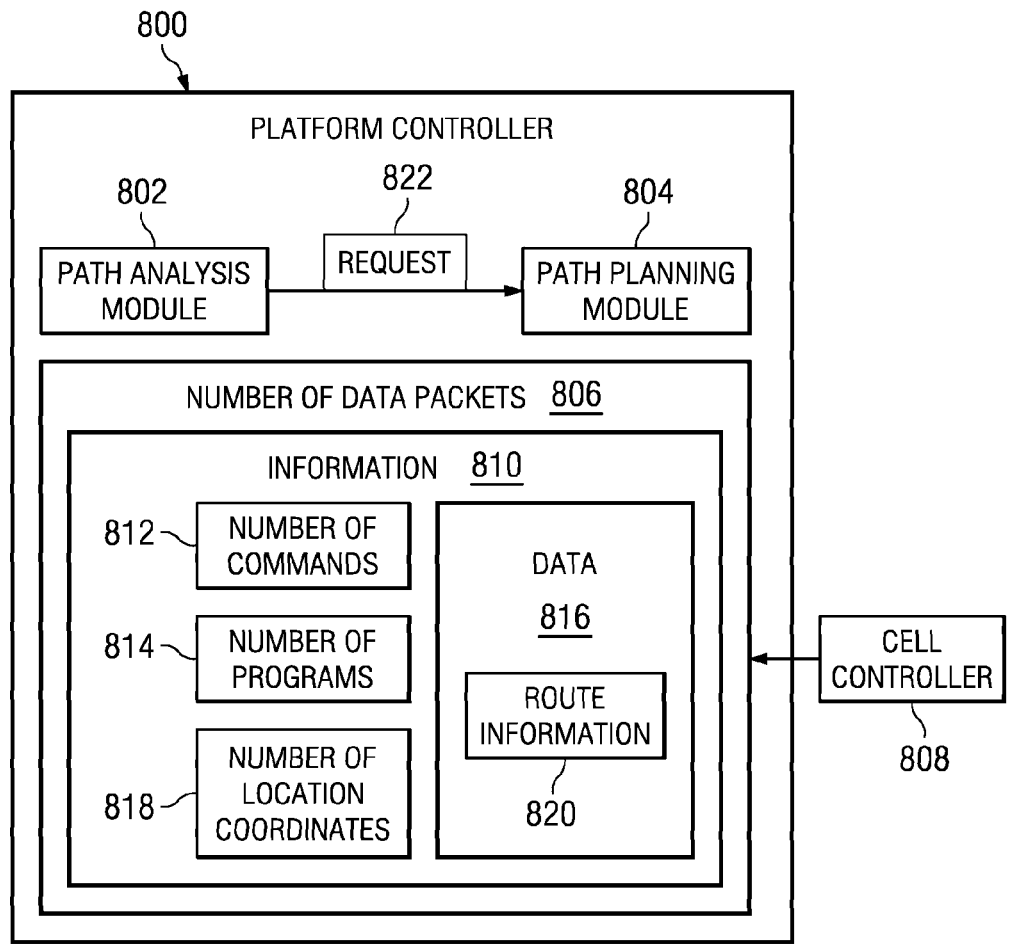
FIG. 8 is an illustration of a platform controller in accordance with an illustrative embodiment.

With reference now to FIG. 8, an illustration of a platform controller is depicted in accordance with an illustrative embodiment. Platform controller 800 may be an example of one implementation of platform controller 374 in FIG. 3.

Platform controller 800 may include path analysis module 802, path planning module 804, and number of data packets 806. Platform controller 800 may receive number of data packets 806 from cell controller 808. Number of data packets 806 may include information 810. Information 810 may include, without limitation, number of commands 812, number of programs 814, data 816, and number of location coordinates 818. Data 816 may include route information 820.

Path analysis module 802 may analyze route information 820 to determine whether or not the route provided by cell controller 808 is feasible. Path analysis module 802 may determine that a number of issues and/or obstacles are present that result in route information 820 being infeasible. Path analysis module 802 may send request 822 to path planning module 804 to generate a new route for the robotic platform associated with platform controller 800.

The illustration of platform controller 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
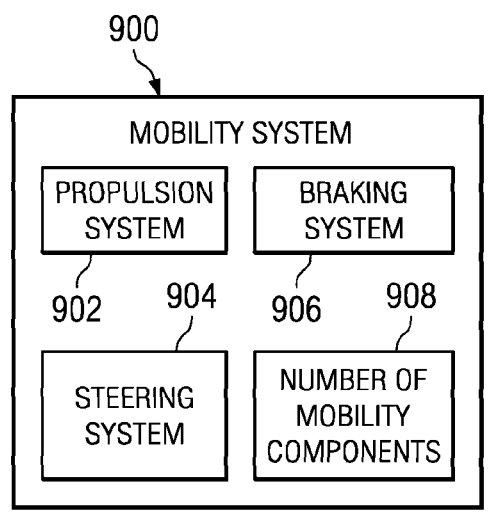
FIG. 9 is an illustration of number of mobility components in accordance with an illustrative embodiment.

With reference now to FIG. 9, an illustration of a mobility system is depicted in accordance with an illustrative embodiment. Mobility system 900 may be an example of one implementation of mobility system 362 of robotic platform 334 in FIG. 3.

Mobility system 900 may include, for example, without limitation, propulsion system 902, steering system 904, braking system 906, and number of mobility components 908. In these examples, propulsion system 902 may propel or move robotic platform 334 in response to commands from platform controller 374 in processor unit 360 of robotic platform 334 in FIG. 3. Propulsion system 902 may maintain or increase the speed at which a robotic platform moves in response to instructions received from platform controller 374 in processor unit 360 in FIG. 3. Propulsion system 902 may be an electrically controlled propulsion system. Propulsion system 902 may be, for example, an internal combustion engine, an internal combustion engine/electric hybrid system, an electric engine, or some other suitable propulsion system.

Steering system 904 may control the direction or steering of a robotic platform in response to commands received from a platform controller. Steering system 904 may be, for example, an electrically controlled hydraulic steering system, an electrically driven rack and pinion steering system, a differential steering system, or some other suitable steering system.

Braking system 906 may slow down and/or stop a robotic platform in response to commands received from a platform controller. Braking system 906 may be an electrically controlled braking system. This braking system may be, for example, a hydraulic braking system, a friction braking system, or some other suitable braking system that may be electrically controlled.

Number of mobility components 908 may provide a robotic platform with the capability to move in a number of directions and/or locations in response to instructions received from a platform controller and executed by propulsion system 902, steering system 904, and braking system 906. Number of mobility components 908 may be, for example, without limitation, wheels, tracks, feet, rotors, propellers, wings, and/or other suitable components.

The illustration of mobility system 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
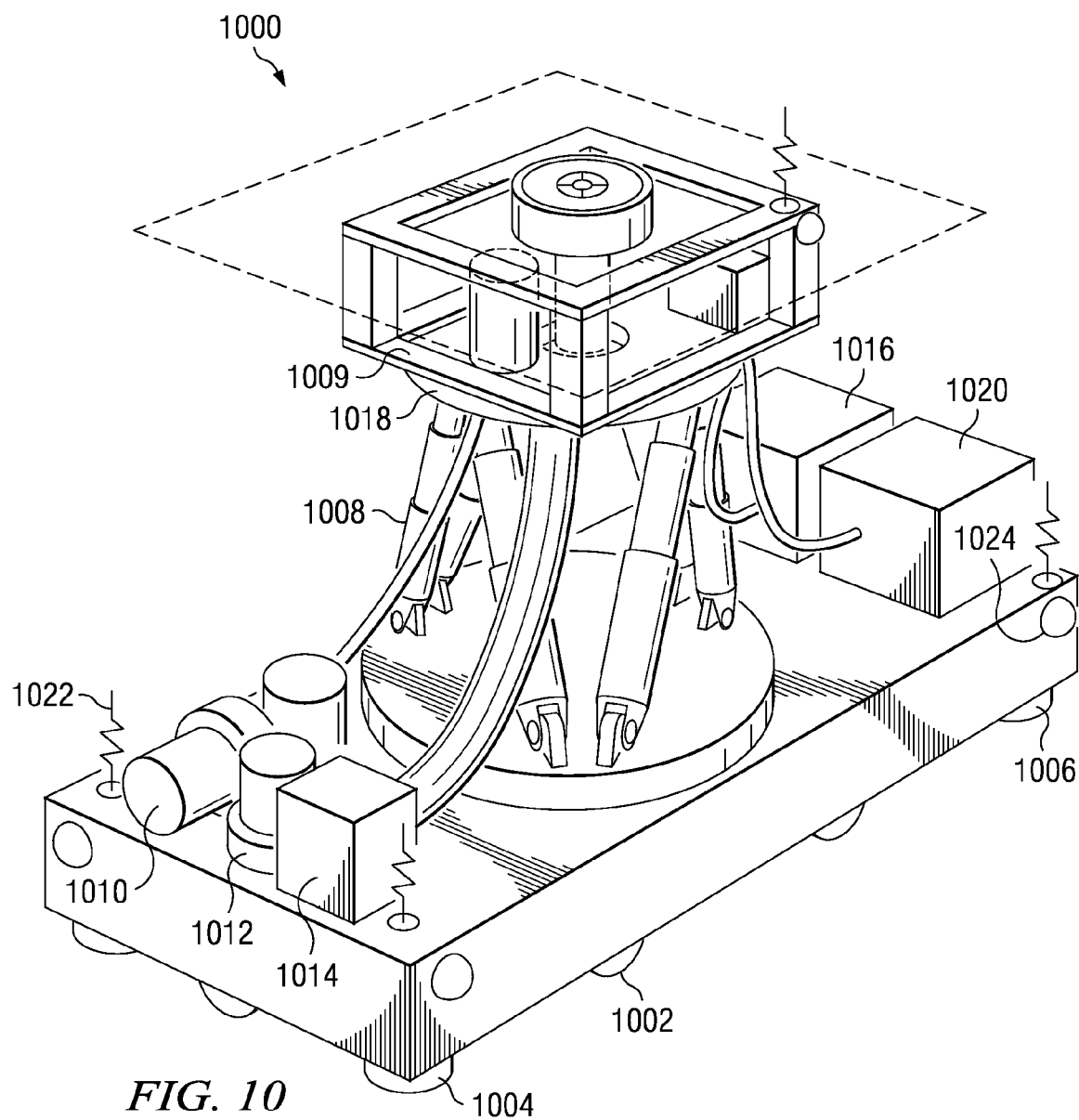
FIG. 10 is an illustration of an autonomous robotic platform in accordance with an illustrative embodiment.

With reference now to FIG. 10, an illustration of an autonomous robotic platform is depicted in accordance with an illustrative embodiment. Robotic platform 1000 may be an example of one implementation of robotic platform 334 in FIG. 3.

Robotic platform 1000 may include wheels 1002. Wheels 1002 may be an example of one implementation of number of mobility components 908 of mobility system 900 in FIG. 9. Robotic platform 1000 may also include resting foot 1004 and resting foot 1006. Resting foot 1004 and resting foot 1006 may be an example of number of feet 376 in number of stability components 364 in FIG. 3.

Robotic platform 1000 may be physically associated with hexapod robot 1008. The illustration of hexapod robot 1008 is not meant to limit the types of robotic devices that may interact with robotic platform 1000. Hexapod robot 1008 is used as an illustrative example of one type of robotic device that may interact with robotic platform 1000. Hexapod robot 1008 may include multi-function end effector 1009.

Robotic platform 1000 includes a number of platform utilities including hydraulic pump 1010, chip extraction system 1012, storage 1014, power supply 1016, and fastener feed 1018. Platform controller 1020 may be implemented as part of a processor unit of robotic platform 1000. Communications antenna 1022 may be an example of one implementation of communications unit 354 in FIG. 3.

Motion sensors 1024 are depicted as an illustrative example of part of a sensor system, such as sensor system 366 in FIG. 3.

The illustration of robotic platform 1000 in FIG. 10 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 11:
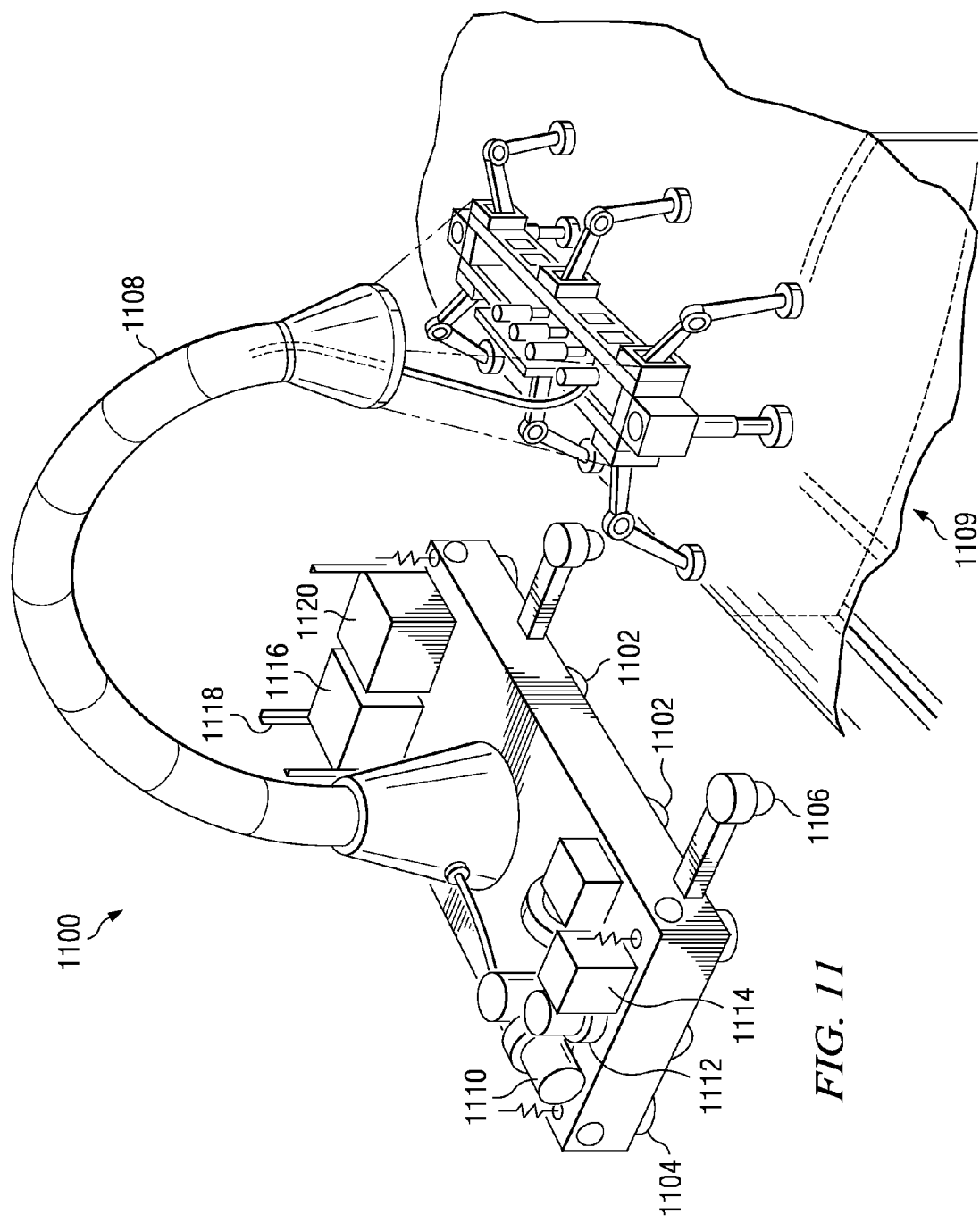
FIG. 11 is an illustration of an autonomous robotic platform in accordance with an illustrative embodiment.

With reference now to FIG. 11, an illustration of an autonomous robotic platform is depicted in accordance with an illustrative embodiment. Robotic platform 1100 may be an example of one implementation of robotic platform 334 in FIG. 3.

Robotic platform 1100 may include wheels 1102. Wheels 1102 may be an example of one implementation of number of mobility components 908 of mobility system 900 in FIG. 9. Robotic platform 1100 may also include resting foot 1104 and retractable support wheel 1106. Resting foot 1104 may be an example of number of feet 376 in number of stability components 364 in FIG. 3. Retractable support wheel 1106 may be an example of number of retractable support wheels 378 in number of stability components 364 in FIG. 3.

Robotic platform 1100 may be physically associated with snorkel robot 1108. The illustration of snorkel robot 1108 is not meant to limit the types of robotic devices that may interact with robotic platform 1100. Snorkel robot 1108 is used as an illustrative example of one type of robotic device that may interact with robotic platform 1100. Snorkel robot 1108 may be deployed to a station to perform operations on, without limitation, wing box 1109, for example.

Robotic platform 1100 includes a number of platform utilities including hydraulic pump 1110, chip extraction system 1112, storage 1114, power supply 1116, and end effector rack 1118. Platform controller 1120 may be implemented as part of a processor unit of robotic platform 1100.

The illustration of robotic platform 1100 in FIG. 11 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12:
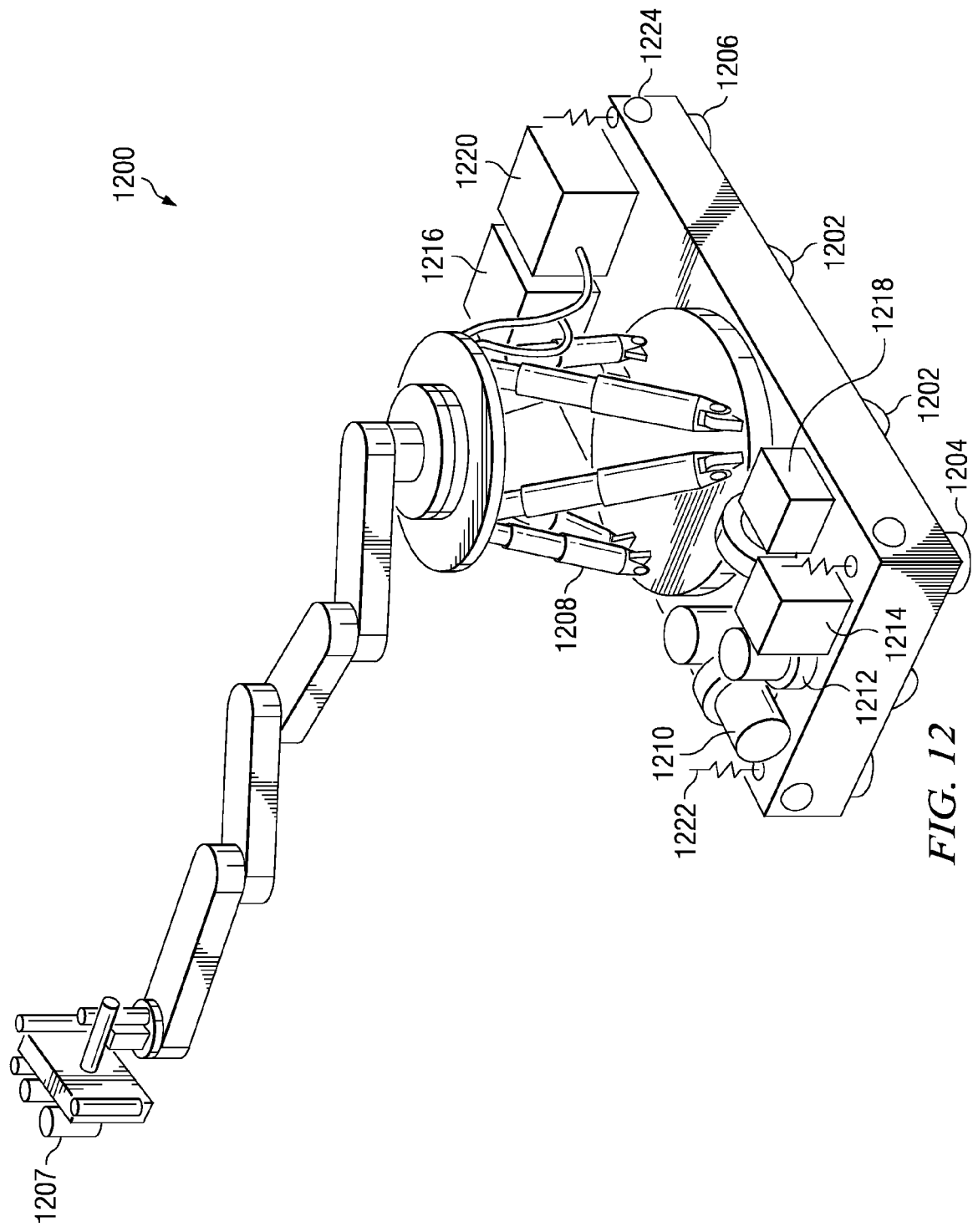
FIG. 12 is an illustration of an autonomous robotic platform in accordance with an illustrative embodiment.

With reference now to FIG. 12, an illustration of an autonomous robotic platform is depicted in accordance with an illustrative embodiment. Robotic platform 1200 may be an example of one implementation of robotic platform 334 in FIG. 3.

Robotic platform 1200 may include wheels 1202. Wheels 1202 may be an example of one implementation of number of mobility components 908 of mobility system 900 in FIG. 9. Robotic platform 1200 may also include resting foot 1204 and resting foot 1206. Resting foot 1204 and resting foot 1206 may be an example of number of feet 376 in number of stability components 364 in FIG. 3.

Robotic platform 1200 may be physically associated with hexapod robot 1208. The illustration of hexapod robot 1208 is not meant to limit the types of robotic devices that may interact with robotic platform 1200. Hexapod robot 1208 is used as an illustrative example of one type of robotic device that may interact with robotic platform 1200. Hexapod robot 1208 may include multi-function end effector 1207.

Robotic platform 1200 includes a number of platform utilities including hydraulic pump 1210, chip extraction system 1212, storage 1214, power supply 1216, and pneumatic system 1218. Platform controller 1220 may be implemented as part of a processor unit of robotic platform 1200. Communication antenna 1222 may be an example of one implementation of communications unit 354 in FIG. 3.

Motion sensor 1224 is depicted as an illustrative example of part of a sensor system, such as sensor system 366 in FIG. 3.

The illustration of robotic platform 1200 in FIG. 12 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 13:
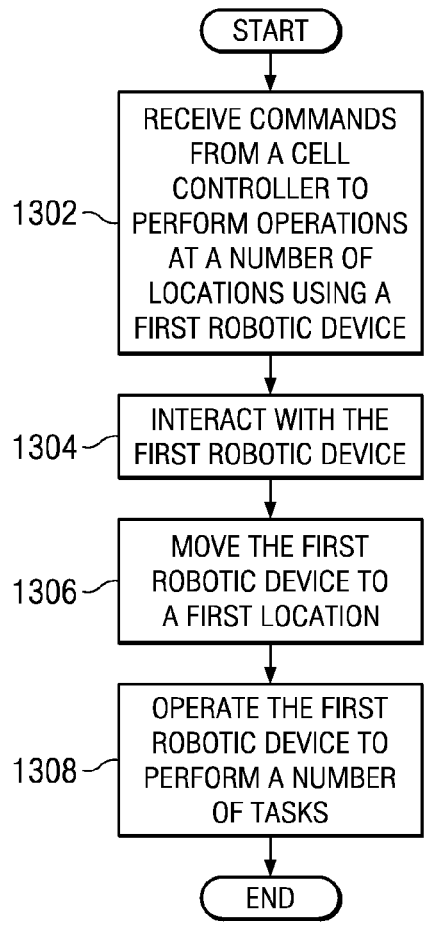
FIG. 13 is an illustration of a flowchart of a process for performing operations using a robotic platform in accordance with an advantageous embodiment.

With reference now to FIG. 13, an illustration of a flowchart of a process for performing operations using a robotic platform is depicted in accordance with an advantageous embodiment. The process in FIG. 13 may be implemented by a component such as robotic platform 334 in FIG. 3, for example.

The process begins by receiving a command from a cell controller to perform operations at a number of locations using a first robotic device (operation 1302). The cell controller may be, for example, cell controller 318 in FIG. 3. The command may be received by robotic platform 334 over wireless communication system 310, for example. Next, the process interacts with the first robotic device (operation 1304). Robotic platform 334 may interact with robotic device 338, for example. Then, the process moves the first robotic device to a first location (operation 1306). The process operates the first robotic device to perform a number of tasks (operation 1308), with the process terminating thereafter.

Figure 14:
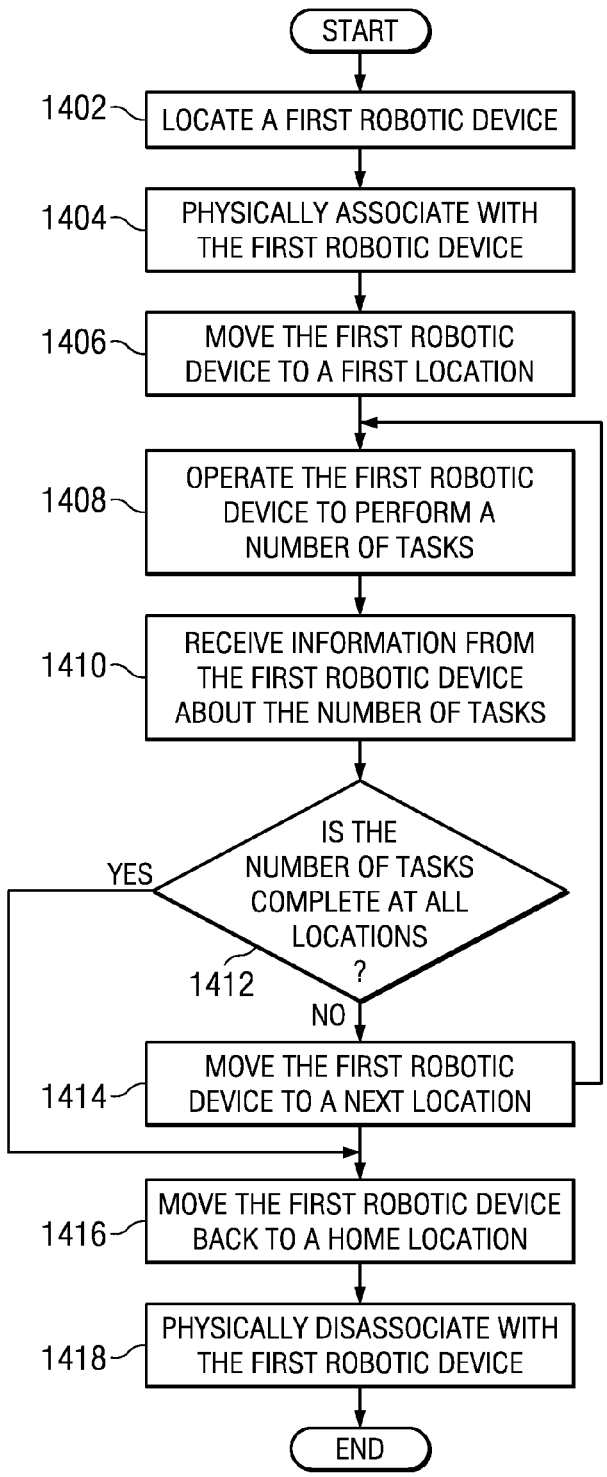
FIG. 14 is an illustration of a flowchart of a process for performing operations using a robotic platform in accordance with an advantageous embodiment.

With reference now to FIG. 14, an illustration of a flowchart of a process for performing operations using a robotic platform is depicted in accordance with an advantageous embodiment. The process in FIG. 14 may be implemented by a component such as robotic platform 334 in FIG. 3, for example.

The process begins by locating a first robotic device (operation 1402). The process may receive location coordinates 330 from cell controller 318 directing a robotic platform to a home location of robotic device 338 in FIG. 3, for example. The process then physically associates with the first robotic device (operation 1404). The process may, for example, pick up the robotic device, attach the robotic device to the robotic platform, secure the robotic device to the robotic platform, and/or move the robotic device to a work location, such as work location 307 in FIG. 3, for example.

Next, the process moves the first robotic device to a first location (operation 1406). A first location may be, for example, work location 307 in number of locations 306 in FIG. 3. The process then operates the first robotic device to perform a number of tasks (operation 1408). The number of tasks may be, for example, number of tasks 337 in FIG. 3. The process then receives information from the first robotic device about the number of tasks (operation 1410). The information received from the first robotic device may be, for example, data about the first task, such as task completion or task status.

The process then determines whether the number of tasks is complete at all locations (operation 1412). If a determination is made that the number of tasks is not complete at all locations, the process moves the first robotic device to a next location (operation 1414) and returns to operation 1408.

If a determination is made that the number of tasks is complete at all locations, the process moves the first robotic device back to a home location (operation 1416). The process then physically disassociates with the first robotic device (operation 1418), with the process terminating thereafter.

Physically disassociating with the first robotic device may include, without limitation, mechanically disconnecting the first robotic device from a robotic platform, electrically disconnecting the first robotic device from a robotic platform, physically disconnecting the first robotic device from a robotic platform, and/or any other physical disassociation.

The illustration of the process for performing operations using a robotic platform in FIG. 14 is not meant to imply physical or architectural limitations to the manner in which different advantageous embodiments may be implemented. Other operations in addition and/or in place of the ones illustrated may be used. Some operations may be unnecessary in some advantageous embodiments. One or more of these operations may be combined and/or divided into different operations when implemented in different advantageous embodiments.

For example, the process may receive information from a first robotic device, and send a message to a cell controller to replace the first robotic device with a second robotic device in order to complete the number of tasks. In another illustrative example, the process may receive information from a first robotic device, and send a message to a cell controller to send a service robotic device with a number of required components needed by the first robotic device to complete the number of tasks at a first location, for example.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments take into account and recognize that currently used methods for structural assembly operations are carried out manually or with machines and robots that are fixed on a factory floor or move along rails. Fixed factory machines and robots have limited flexibility, are dedicated to a few specific tasks, and may be hardwired to the factory floor and utilities.

Thus, one or more of the different advantageous embodiments may provide an apparatus that may comprise a number of robotic platforms, a wireless communications system, and a computer system. The number of robotic platforms may be configured to move to a number of locations in an assembly area and interact with a number of robotic devices. The wireless communications system may be configured to provide communication with the number of robotic platforms and the number of robotic devices within the assembly area. The computer system may be configured to exchange information with the number of robotic platforms and the number of robotic devices using the wireless communications system.

The different advantageous embodiments may further provide a method for performing operations using a robotic platform. Commands may be received by the robotic platform from a cell controller to perform a number of tasks at a number of locations using a first robotic device in a number of robotic devices. The robotic platform may interact with the first robotic device in the number of robotic devices. The first robotic device may be moved to a first location in the number of locations.

The different advantageous embodiments may further provide an apparatus that may comprise a robotic platform having a platform controller, a mobility system, a utility system, a device connection interface, and a communications unit. The platform controller may be configured to move the robotic platform to a number of locations. The mobility system may be coupled to the robotic platform and may be configured to be controlled by the platform controller. The utility system may be coupled to the robotic platform and may be configured to supply utilities to a number of robotic devices. The device connection interface may be configured to physically associate the number of robotic devices with the robotic platform.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing operations using a plurality of robotic platforms, the method comprising:
   receiving, by a first robotic platform in the plurality of robotic platforms, commands from a cell controller to perform a number of tasks at a number of locations using a first robotic device in a plurality of robotic devices, wherein the first robotic platform is autonomous, and wherein the first robotic platform is distinct from the first robotic device and from the plurality of robotic devices;
   interacting, by the first robotic platform, with a sensor system configured to interact with a factory motion control system, wherein the sensor system further comprises a plurality of reflective components distributed on the plurality of robotic platforms configured to move to a plurality of locations in an assembly area and interact with the plurality of robotic devices, wherein the plurality of robotic devices are all distinct from the plurality of robotic platforms, the factory motion control system uses the plurality of reflective components to detect and track the plurality of robotic platforms, and the factory motion control system is configured to detect and track at least one of position and movement of each of the plurality of robotic platforms;
   interacting autonomously, by the first robotic platform, with the first robotic device in the plurality of robotic devices;
   moving, using a mobility system coupled to the robotic platform, the first robotic device to a first location in the number of locations, wherein the mobility system allows the robotic platform to move autonomously, the mobility system comprising a number of wheels, a propulsion system, and a steering system; and
   performing, by the first robotic device, a first task at the first location.

2. The method of claim 1, wherein interacting autonomously, by the first robotic platform, with the first robotic device further comprises:
   physically associating the first robotic platform with the first robotic device to form an associated first robotic device; and
   operating the associated first robotic device to perform the first task.

3. The method of claim 2, wherein interacting autonomously, by the first robotic platform, with the first robotic device further comprises:

sending at least one of power and control signals to the associated first robotic device.

4. The method of claim 2, wherein interacting autonomously, by the first robotic platform, with the first robotic device further comprises:
receiving information from the associated first robotic device about the first task.

5. The method of claim 2, wherein interacting autonomously, by the first robotic platform, with the first robotic device further comprises:
moving the associated first robotic device to a second location in the number of locations using the mobility system; and
operating the associated first robotic device to perform a second task.

6. The method of claim 2, further comprising:
physically disassociating the first robotic platform from the first robotic device; and
interacting, by the robotic platform, with a second robotic device to form an associated second robotic device.

7. The method of claim 6, further comprising:
moving, using the mobility system, the associated second robotic device to the first location in the number of locations; and
performing a second task using the second robotic device.

8. The method of claim 6, further comprising:
moving, using the mobility system, the associated second robotic device to a second location in the number of locations; and
performing a second task using the second robotic device.

9. The method of claim 1, further comprising:
receiving data from the first robotic device; and
sending a message about the data to the cell controller.

10. The method of claim 9, wherein the data comprises information about at least one of a task completion, a partial task completion, a task status, a task requirement, and a robotic device requirement.

11. An apparatus comprising:
a plurality of robotic platforms configured to move to a plurality of locations in an assembly area and interact with a plurality of robotic devices, wherein each robotic platform in the plurality of robotic platforms comprises a corresponding mobility system, which allows the each robotic platform to move autonomously, wherein each mobility system comprises a number of wheels, a propulsion system, and a steering system, and wherein the plurality of robotic devices are all distinct from the plurality of robotic platforms;
a wireless communications system configured to provide communication with the plurality of robotic platforms and the plurality of robotic devices within the assembly area;
a computer system configured to exchange information with the plurality of robotic platforms and the plurality of robotic devices using the wireless communications system;
a factory motion control system configured to detect and track at least one of position and movement of each of the plurality of robotic platforms; and
a sensor system configured to interact with the factory motion control system, wherein the sensor system further comprises a plurality of reflective components distributed on the plurality of robotic platforms, and wherein the factory motion control system uses the plurality of reflective components to detect and track the plurality of robotic platforms.

12. The apparatus of claim 11, further comprising:
a plurality of utility systems coupled to the plurality of robotic platforms and configured to supply utilities to the plurality of robotic devices.

13. The apparatus of claim 11, wherein one robotic platform in the plurality of robotic platforms is configured to interact with a plurality of robotic devices using a device connection interface.

14. The apparatus of claim 13, wherein the device connection interface includes mechanical connections for the plurality of robotic devices.

15. The apparatus of claim 13, wherein the device connection interface includes electrical connections for the plurality of robotic devices.

16. An apparatus comprising:
a robotic platform having a platform controller configured to move the robotic platform to a number of locations, the platform controller configured to use route information to move the robotic platform within an area;
a mobility system coupled to the robotic platform and configured to be controlled by the platform controller, wherein the mobility system allows the robotic platform to move autonomously, the mobility system comprising a number of wheels, a propulsion system, and a steering system, wherein the wheels provide the robotic platform with capability to move in a number of directions in response to instructions received from the platform controller and executed by the propulsion system and the steering system;
a utility system coupled to the robotic platform and configured to supply utilities to a number of robotic devices;
a device connection interface configured to physically associate the number of robotic devices with the robotic platform;
a communications unit; and
a sensor system configured to interact with a factory motion control system, wherein the sensor system further comprises a number of reflective components distributed on the robotic platform, and wherein the factory motion control system uses the number of reflective components to detect and track the robotic platform.

17. The apparatus of claim 16, further comprising:
a collision avoidance system configured to detect objects in an environment and avoid collision with the objects in the environment.

18. The apparatus of claim 16, further comprising:
a number of stability components coupled to the robotic platform.

19. An apparatus comprising:
a robotic platform having a platform controller configured to use route information to move the robotic platform to a number of locations, the platform controller comprising a path analysis module to analyze the route information to determine whether a route provided by a cell controller is feasible;
a mobility system coupled to the robotic platform and configured to be controlled by the platform controller, wherein the mobility system allows the robotic platform to move autonomously, the mobility system comprising a number of wheels, a propulsion system, and a steering system, wherein the wheels provide the robotic platform with capability to move in a number of directions in response to instructions received from the platform controller and executed by propulsion system and steering system;
a utility system coupled to the robotic platform and configured to supply utilities to a number of robotic devices;

a device connection interface configured to physically associate the number of robotic devices with the robotic platform;
a communications unit;
a collision avoidance system configured to detect objects in an environment and avoid collision with the objects in the environment;
a number of stability components coupled to the robotic platform; and
a sensor system configured to interact with a factory motion control system, wherein the sensor system further comprises a number of reflective components distributed on the robotic platform, and wherein the factory motion control system uses the number of reflective components to detect and track the robotic platform.

20. An apparatus comprising:
a number of robotic platforms configured to move to a number of locations in an assembly area and interact with a number of robotic devices, wherein a robotic platform in the number of robotic platforms is configured to interact with a number of robotic devices using a device connection interface, wherein the device connection interface includes at least one of mechanical connections and electrical connections for a robotic device in the number of robotic devices;
a wireless communications system configured to provide communication with the number of robotic platforms and the number of robotic devices within the assembly area;
a computer system configured to exchange information with the number of robotic platforms and the number of robotic devices using the wireless communications system;
a number of utility systems coupled to the number of robotic platforms and configured to supply utilities to the number of robotic devices, wherein the number of utility systems further comprise at least one of:
  a power supply;
  a hydraulic pump;
  a pneumatic system;
  a chip extraction system;
  a storage system;
  a fastener feed; and
  an end effector rack;
a number of mobility systems configured to move the number of robotic platforms to the number of locations, wherein the number of mobility systems allows the number of robotic platforms to move autonomously, the number of mobility systems each comprising a number of wheels, a propulsion system, and a steering system, wherein the wheels provide the robotic platform with capability to move in a number of directions in response to instructions received from a platform controller and executed by the propulsion system and the steering system;
a factory motion control system configured to detect and track at least one of position and movement of the robotic platform; and
a sensor system configured to interact with the factory motion control system, wherein the sensor system further comprises a number of reflective components distributed on the number of robotic platforms, and wherein the factory motion control system uses the number of reflective components to detect and track the robotic platform.

21. A method for performing operations using a robotic platform, the method comprising:
receiving, by the robotic platform, commands from a cell controller to perform a number of tasks at a number of locations using a first robotic device in a number of robotic devices;
interacting with the first robotic device in the number of robotic devices;
physically associating the robotic platform with the first robotic device to form an associated first robotic device;
moving the associated first robotic device to a first location in the number of locations, using a mobility system, wherein the mobility system allows the associated first robotic device to move autonomously, the mobility system comprising a number of wheels, a propulsion system, and a steering system, wherein the wheels provide the robotic platform with capability to move in a number of directions in response to instructions received from a platform controller and executed by the propulsion system and the steering system;
operating the associated first robotic device to perform a first task;
sending at least one of power and control signals to the associated first robotic device;
receiving information from the associated first robotic device about the first task;
moving the associated first robotic device to a second location in the number of locations;
operating the associated first robotic device to perform a second task;
receiving information from the associated first robotic device;
physically disassociating the robotic platform from the first robotic device;
interacting, by the robotic platform, with a second robotic device to form an associated second robotic device;
moving the associated second robotic device to the first location in the number of locations;
receiving information from the associated second robotic device; and
moving the associated second robotic device to the second location in the number of locations;
receiving data from the associated second robotic device, wherein the data comprises information about at least one of a task completion, a partial task completion, a task status, a task requirement, and a robotic device requirement; and
sending a message about the data to the cell controller.

* * * * *